US008935015B2

(12) United States Patent
Olsoe et al.

(10) Patent No.: US 8,935,015 B2
(45) Date of Patent: Jan. 13, 2015

(54) FLIGHT CONTROL SYSTEM WITH ALTERNATE CONTROL PATH (75) Inventors: Jonathan S. Olsoe, Star, ID (US); David McLaughlin, Mercer Island, WA (US); Charles B. Hartin, Ft. Worth, TX (US); Luc Cyrot, Mission Viejo, CA (US); Bruce Streeter, San Clemente, CA (US); Stephane Wanchu, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 304 days.

(21) Appl. No.: 13/308,818

(22) Filed: Dec. 1, 2011

(65) Prior Publication Data
US 2012/0290153 A1    Nov. 15, 2012

Related U.S. Application Data (60) Provisional application No. 61/484,013, filed on May 9, 2011.

(51) Int. Cl.
*G05D 1/00* (2006.01)
*B64C 13/42* (2006.01)
*B64C 13/50* (2006.01)

(52) U.S. Cl.
CPC .............. *G05D 1/0077* (2013.01); *B64C 13/42* (2013.01); *B64C 13/503* (2013.01)
USPC ............................................................ 701/3

(58) Field of Classification Search
CPC .................................................... B64C 13/503
USPC ........................................................ 244/194
See application file for complete search history.

(56) References Cited

U.S. PATENT DOCUMENTS

| 5,493,497 | A | 2/1996 | Buus |
| 6,561,463 | B1 | 5/2003 | Yount et al. |
| 6,704,624 | B2 | 3/2004 | Ortega |
| 6,860,452 | B2 | 3/2005 | Bacon et al. |
| 7,840,316 | B2 | 11/2010 | Yount et al. |
| 7,878,461 | B2 | 2/2011 | Hirvonen et al. |
| 2007/0164166 | A1* | 7/2007 | Hirvonen ...................... 244/175 |

FOREIGN PATENT DOCUMENTS

WO    2007084679    7/2007

OTHER PUBLICATIONS

Creedy, Kathryn. "Raising the Bar—Embraer's Business Jet Advantage Part II." Aviation Today, Sep. 28, 2009.*

* cited by examiner

*Primary Examiner* — John Q Nguyen
*Assistant Examiner* — Michael Kerrigan
(74) *Attorney, Agent, or Firm* — Renner, Otto, Boisselle & Sklar, LLP (57) ABSTRACT

A flight control system and method including a primary flight control path between one or more pilot controls and control surface actuators on an associated aircraft, wherein the primary control path includes one or more flight control computers and one or more first data concentrators; and a secondary flight control path between the one or more pilot controls and the control surface actuators, wherein the secondary flight control path utilizes direct mode control laws to control the control surface actuators; wherein the primary flight control path and the secondary flight control path are independent from each other and the secondary flight control path is operative upon detection of a fault in the primary flight control path.

13 Claims, 5 Drawing Sheets

FLIGHT CONTROL SYSTEM WITH ALTERNATE CONTROL PATH

RELATED APPLICATION DATA

The present application claims the benefit of the filing date of U.S. Provisional Patent Application Ser. No. 61/484,013 filed May 9, 2011, which is incorporated herein by reference in its entirety.

TECHNICAL FIELD

The present invention relates to an electronic control system to provide for continued safe flight and landing when common mode faults of the primary system occur.

BACKGROUND

Modern aircraft rely on multiple redundancy to achieve continued safe operation in the presence of single or multiple failures in critical systems, such as electronics, hydraulics, and flight control. However, if there is a malfunction of the primary control system or the primary control system becomes unavailable, there can be severe consequences. Conventional flight control systems are generally incapable of maintaining safe air flight of an aircraft when faced with the unanticipated loss of significant portions of the primary flight control system.

SUMMARY

The present invention overcomes the above mentioned problems by providing separate control mechanism independent of the primary control system to allow for continued safe flight and landing of the aircraft under virtually all operating conditions should the primary control system become unavailable.

Aspects of the present invention relate to a full-time flight critical flight control system for use in aircraft. The flight control system is based on electronic signaling and application of software-based control laws in a primary control mode and a reversionary mode of operation. The reversionary mode of operation provides for continued safe flight and landing for any common mode fault of the primary system. The reversionary mode of operation is an independent and dissimilar alternate control path from the primary control path. The alternate control path provides a direct link between the pilot controls and the control surface actuators by way of simplified electronics, fully independent from the operation of the primary flight controls system. The system includes a highly robust alternate means of control sub-system which allows for simplification of the primary control system (e.g., a reduction in complexity associated with providing additional protection against common mode failures within the primary control system).

One aspect of the invention relates to a flight control system including: a primary flight control path between one or more pilot controls and control surface actuators on an associated aircraft, wherein the primary control path includes one or more flight control computers and one or more first data concentrators; a secondary flight control path between the one or more pilot controls and the control surface actuators, wherein the secondary flight control path utilizes direct mode control laws to control the control surface actuators; and wherein the primary flight control path and the secondary flight control path are independent from each other and the secondary flight control path is operative upon detection of a fault in the primary flight control path.

Another aspect of the invention relates to an aircraft including: a primary flight control path between one or more pilot controls and control surface actuators, wherein the primary control path includes one or more flight control computers and one or more first data concentrators; a secondary flight control path between the one or more pilot controls and the control surface actuators, wherein the secondary flight control path utilizes direct mode control laws to control the control surface actuators; and wherein the primary flight control path and the secondary flight control path are independent from each other and the secondary flight control path is operative upon detection of a fault in the primary flight control path.

Another aspect of the invention relates to a method for controlling an aircraft, the method including: utilizing a primary flight control path between one or more pilot controls and control surface actuators on an associated aircraft, wherein the primary control path includes one or more flight control computers and one or more first data concentrators during normal operation; detecting a fault in the primary flight control path; and switching from a the first flight control path to a secondary flight control path, wherein the secondary flight control path utilizes direct mode control laws to control surface actuators based on received pilot controls.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Embodiments of this invention will now be described in further detail with reference to the accompanying drawings, in which.

DETAILED DESCRIPTION OF EMBODIMENTS

Aspects of the present invention relate to a full-time flight critical flight control system for use in aircraft. The flight control system is based on electronic signaling and application of software-based control laws in a primary control mode and a reversionary mode of operation. The reversionary mode of operation provides for continued safe flight and landing for any common mode fault of the primary system. The reversionary mode of operation is an independent and, optionally may be a dissimilar, alternate control path from the primary control path. The alternate control path provides a direct link between the pilot controls and the control surface actuators by way of simplified electronics, fully independent from the operation of the primary flight controls system. The system includes a highly robust alternate means of control sub-system which allows for simplification of the primary control system (e.g., a reduction in complexity associated with providing additional protection against common mode failures within the primary control system).

Figure 1:
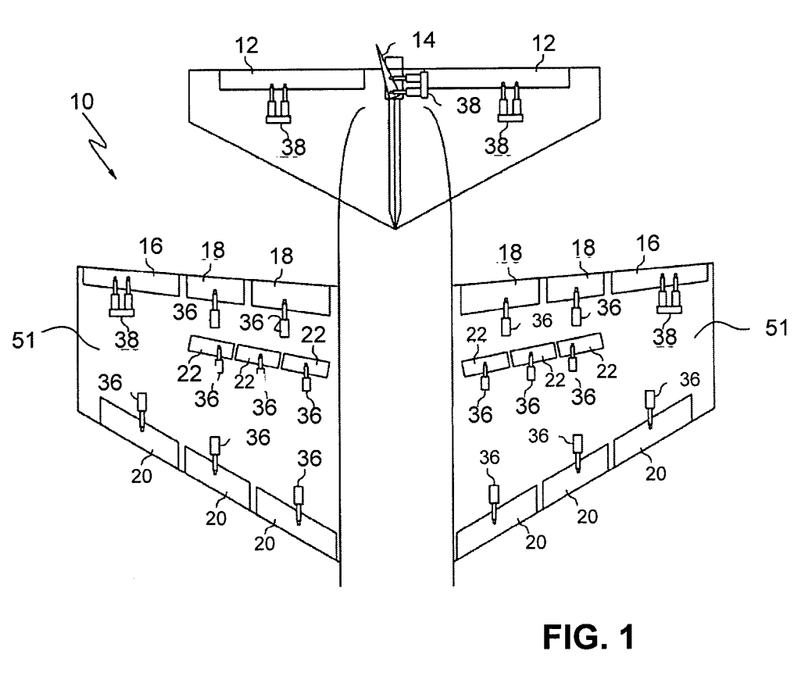
FIG. 1 is an exemplary aircraft in accordance with aspects of the present invention.

Referring now to FIG. 1, a schematic diagram of a portion of an exemplary aircraft having a plurality of flight control surfaces is shown. In the illustrated embodiment, the aircraft 10 includes a pair of elevators 12, a rudder 14, and a pair of ailerons 16, which are the primary flight control surfaces, and a plurality of flaps 18, slats 20, and spoilers 22, which are the secondary flight control surfaces. The primary flight control surfaces 12-16 control aircraft movements about the aircraft pitch, yaw, and roll axes. Specifically, elevators 12 are used to control aircraft movement about the pitch axis, the rudder 14 is used to control aircraft movement about the yaw axis, and the ailerons 16 control aircraft movement about the roll axis. It is noted, however, that aircraft movement about the yaw axis can also be achieved either by banking the aircraft or by varying the thrust levels from the engines on opposing sides of the aircraft 10.

The secondary control surfaces 18-22 influence the lift and drag of the aircraft 10. For example, during aircraft take-off and landing operations, when increased lift is desirable, the flaps 18 and slats 20 may be moved from retracted positions to extended positions. In the extended position, the flaps 18 increase both lift and drag, and enable the aircraft 10 to descend more steeply for a given airspeed, and also enable the aircraft 10 to get airborne over a shorter distance. The slats 20, in the extended position, increase lift and allow for higher angles of attack without aerodynamic stall of the wing, and are typically used in conjunction with the flaps 18. The spoilers 22, on the other hand, reduce lift and when moved from retracted positions to extended positions, which is typically done during aircraft landing operations, and may be used as air brakes to assist in slowing the aircraft 22.

A pilot generally controls aircraft flight through cockpit controls. There are number of primary cockpit controls. Such primary controls include, for example, a joystick or a control yoke that controls roll and pitch by moving the ailerons when turned or deflected left and right, and moves the elevators when moved backwards or forwards; rudder pedals, control yaw, which move the rudder; throttle controls to control engine speed or thrust for powered aircraft.

In addition to the primary flight controls for roll, pitch, and yaw listed above, there are often secondary controls available to give the pilot finer control over flight or to ease the workload. The most commonly-available secondary flight control is a wheel or other device to control elevator trim, so that the pilot does not have to maintain constant backward or forward pressure to hold a specific pitch attitude, for example. Many aircraft have wing flaps, controlled by a switch or a mechanical lever or in some cases are fully automatic by computer control, which alter the shape of the wing for improved control at the slower speeds used for takeoff and landing. Other secondary flight control systems may be available, including slats, spoilers, air brakes and variable-sweep wings, etc.

Figure 2:
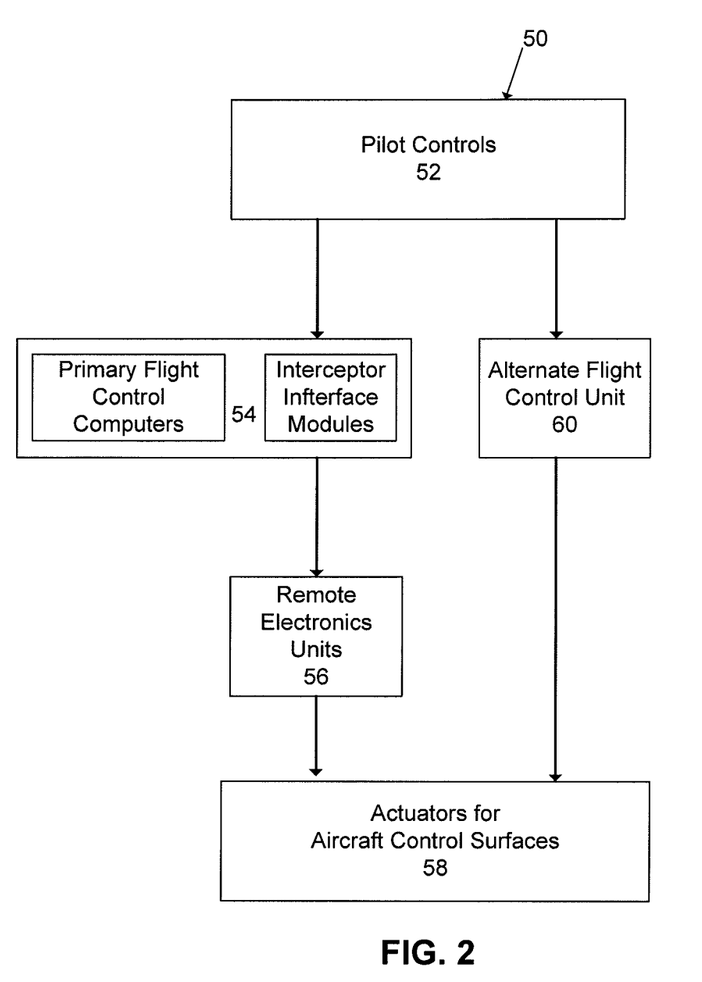
FIG. 2 is an exemplary system in accordance with aspects of the present invention.

An exemplary flight control system 50 is illustrated in FIGS. 2 and 3A-3C. FIG. 2 provides a high-level view of FIGS. 3A-3C. Block 52 illustrates flight control inputs from a pilot through one or more pilot flight controls listed above and/or auto-pilot (e.g., pilot sidestick, co-pilot, sidestick, rudder pedals, flight spoiler control lever (FSCL), glareshield pilot stick priority switch, glareshield co-pilot stick priority switch, lateral trim switch, etc.). One control path from the pilot controls 52 is directed to block 54. At block 54 primary flight control computers (PFCCs) and inceptor interface modules (IIMs) process the received inputs and output control signals to remote electronics units (REUs) at block 56, The REUs generate a control to control the actuators of the various moveable flight surfaces associated with the aircraft (e.g., components 12-22). A separate and independent control path from block 52 is provided to block 60. As explained in more detail, block 60 provides an alternative flight control buss that does not require any data busses in operation and operates independently of the PFCCs. The output from block 60 is used to directly control the actuators (illustrated in block 58) in a direct control mode (e.g., without processing from the PFCCs).

Figure 3A:
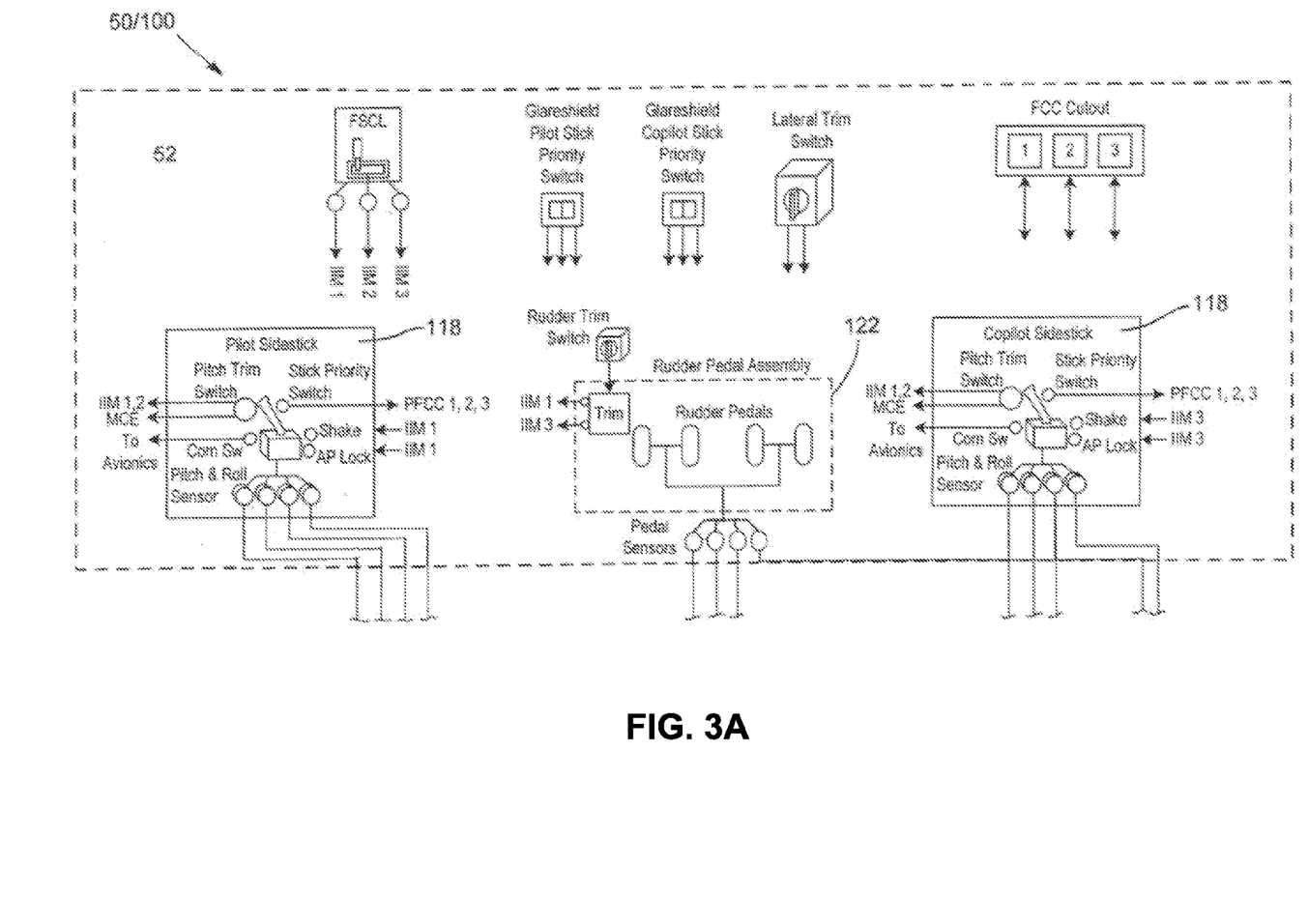
FIGS. 3A-3C are detailed schematic views of the exemplary system illustrated in FIG. 2.
Figure 3B:
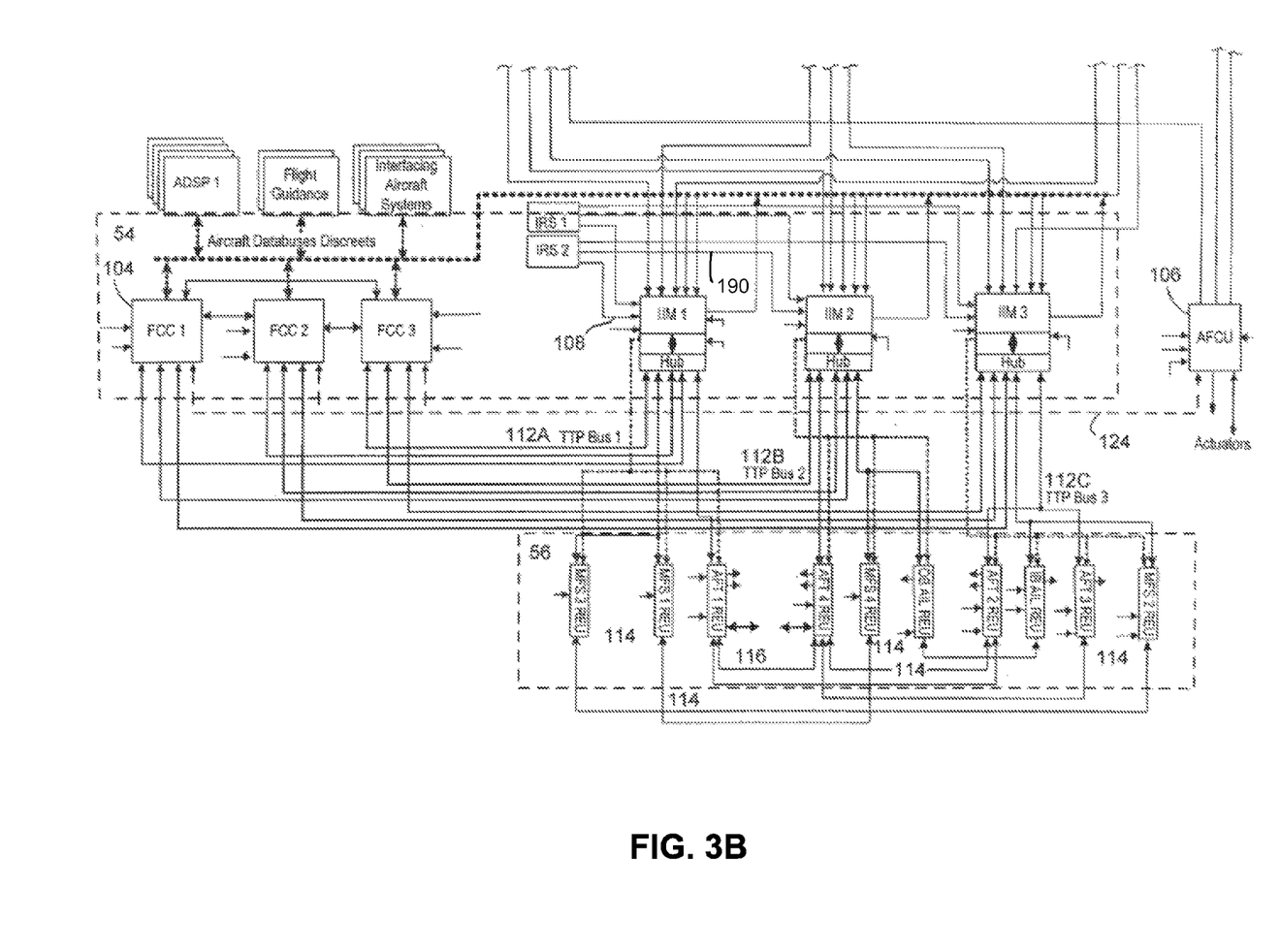
Figure 3C:
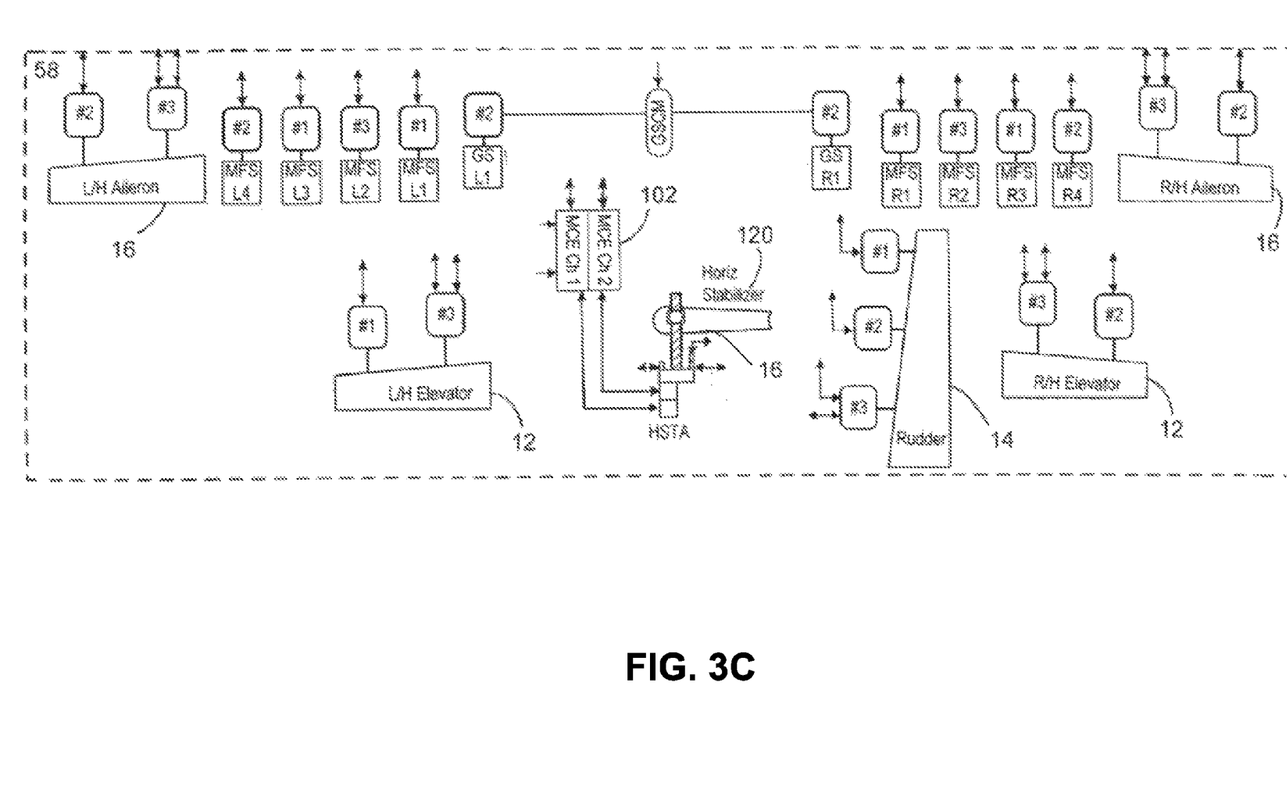

FIGS. 3A-3C are detailed schematic views that illustrates integrated Fly-By-Wire control system 100 that provides control and monitoring of all primary and secondary flight controls. The system 100 also provides full-time augmentation of pilot commands and flight envelope protection during manual and auto flight. The system 100 applies to a variety of aircrafts.

Pilot control of primary surfaces is provided through side sticks and a speed brake lever along with the flight control inputs set forth above. The flap selector level may be used to control positioning of the flaps. The flap drive motors and other equipment may be supported by a dual-channel Motor Control Electronics (MCE) 102, which similar to what is shown in the diagram for the Horizontal Stabilizer. The MCE 102 may be monitored and controlled by Remote Electronic Units (REUs) 56, identified generally in rectangular form with dashed lines. Additional controls include Pitch Trim, Roll Trim, and Yaw Trim.

The System 100 utilizes hydraulically powered actuation for primary surface control (ailerons 16, elevators 12, and rudder 14) and spoilers 22, and electromechanically powered actuation for the stabilizer. Each primary surface may have two (2) actuators in an active-active configuration, as illustrated in FIG. 1. The spoiler surface may have a single actuator. The stabilizer actuation system includes two motors in an active-standby configuration. One of ordinary skill in the art will readily appreciate that the quantity of actuators described above is explanatory in nature and any number of actuators may be used in accordance with aspects of the claimed invention.

Augmentation of the pilot commands during manual flight ("Normal Mode" operation) is provided through PFCCs 104, identified in rectangular form with broken lines. Full time augmentation is provided such that the sidestick commands result in pitch, roll, and yaw responses, for example. There are three PFCCs 104 illustrated in FIG. 3B. Each of the PFCCs 104 is operable to communicate with each other through a cross-channel data link.

"Direct Mode" control of the actuators is provided as a regression mode of operation through the alternate flight control unit (AFCU) 106, in the event of loss of critical data to support the augmentation control laws, or multiple PFCCs failures. The system is capable of safe flight and landing after reversion to Direct Mode. Direct Mode provides direct "stick to surface" control of the Primary Surfaces and the horizontal stabilizer, with no augmentation. The alternate control path operation is described in detail below.

Pilot controls may be read by three electronics boxes called inceptor interface modules (IIMs) 108. The IIMs 108 perform limited monitoring and transmit the cockpit sensor positions directly to the PFCCs 104. There are three IIMs illustrated in FIG. 3B. In one embodiment, the IIMs 108 are single lane, and in one embodiment may be designed using dissimilar Hardware and Firmware, to avoid propagation of a generic failure to the entire system. The commands are transmitted using the Time Triggered Protocol (TTP) bus protocol. The AFCU 106, discussed below, also reads a dedicated set of inceptor sensors and provides the data independently to the PFCCs. The use of IIMs 108 provide for the following: pilot control sensor excitation and demodulation; and dual dissimilar data bus control for communication with both the PFCCs 104 and the REUs 114.

The PFCCs 104 receive pilot commands from the IIMs 108 and AFCU 106, perform sensor selection and voting, and calculate the appropriate surface command based on the Normal Mode control laws. The PFCCs 1104 are a dual lane design to insure high integrity of the sensor voting and surface commands. As illustrated, three (3) PFCCs 104 are included to provide fail-operational capability. The system 100 can be made to function with just two PFCCs as part of the initial design or more PFCCs, as is desirable.

The PFCCs 104 also receive flight path angle and bank angle commands directly from the autopilot 110, without the use of traditional autopilot servos to backdrive the controls. The PFCCs 104 provide inner loop control using the same control laws utilized in Normal Mode. During autopilot engagement, the side sticks are held at neutral, and require a minimum breakout force to disengage the autopilot.

The PFCCs 104 transmit the surface commands via time triggered protocol (TTP) busses 112 to one or more REUs 114, which command the actuators via analog signal paths. The REUs 114 are a dual lane, (Com-Mon) design, to insure integrity of the actuator command. Each REU 114 controls two hydraulic actuators and one Electro-Mechanical (Flaps or PTA) channel. The REUs 114 command the hydraulic actuators via Electro-Hydraulic Servo Valves (EHSV) and Mode Select Valves (MSV) by way of a Solenoid Operated Valve (SOV) on each actuator. Actuator position feedback provided via embedded dual LVDTs in the Main Ram of each actuator is used by the REUs 114 to close the position loop. Pressure sensors are also used for control of force-fight between actuators on a given primary surface. The REUs 114 command the actuator from damped to active mode via an MSV solenoid, and reads an MSV position feedback sensor for test purposes. A RS485 Cross Channel Data Link (CCDLs) 116 is provided between the REUs 114 that control each pair of actuators on a surface, for purposes of exchanging pressure sensor data for force fight mitigation, and actuator status flags for use in actuator-surface engagement logic.

The REUs 114 may contain two servo loop channels and two serial data bus channels for actuator control of different types. Each REU 114 is configured to provide the following capabilities: command response based on data from one of two dissimilar data busses; force fight mitigation; rigging; and monitoring and self-testings.

The REUs 114 command the electromechanical actuators indirectly through a separate Motor Control Electronics box, or MCE 102. Communication from the REUs 114 to the MCEs 102 is made via a RS485 MCE Channel Data Link (MCDL), and two high integrity discretes. The MCEs 102 provide the high current 3 phase "H-Bridge" drive for the motor, perform the closed loop velocity control over the motors, and control the electromechanical brakes.

The primary actuators have two modes of operation, active, and damped bypass. The actuators are in damped bypass mode when their MSV solenoids are de-energized. The REUs 114 command the actuators to active mode by energizing the MSV solenoids, which pilot the mode select valves (MSV) into the active position. The active position connects the cylinder ports to the electro-hydraulic servo valve (EHSV) and disconnects the cylinder ports from the damping orifice. The REU provides positional control by comparing the commanded ram position to the actual ram position, and commanding the EHSV accordingly.

The spoiler actuators are also controlled by the REUs 114. The REUs 114 provide positional control by comparing the commanded ram position to the actual ram position, and commanding the EHSV accordingly.

The optional flap actuation system is commanded by two of the REUs 114 (e.g., via two independent MCE channels in an active-active configuration. The flap MCEs provide closed-loop velocity control of the motors, which are speed-summed in the Flap Power Drive Unit (PDU). The REUs 114 provide positional control by receiving feedback from position sensors on the Flap Actuation system, demodulated by the IIMs 108 and transmitted to the REUs 114 over the direct mode busses. The REU 114 and MCE 102 also command the flap system brakes to release during commands, and de-energize the brakes after the actuators reach the commanded position.

The pitch trim actuation system is also commanded by two REUs 114 via two independent MCE channels in an active-standby configuration. The MCEs 102 provide closed-loop velocity control of the motors. The REU 114 provides stabilizer position for avionics and crew display by demodulating position sensors mounted on the pitch trim actuator. The pitch trim system contains two independent load paths that are mechanically linked. The mechanical link can be opened via an electromechanical clutch to allow for automatic verification of the two load paths.

FIG. 3A illustrates sidestick controllers 118, however conventional type controls (i.e., column and wheel) work equally as well with the architecture. FIG. 3A also illustrates two main data bus types used in the system. The primary data bus is shown as TTP 112 (e.g., 112A-112C) and the secondary data bus 190 is traditional ARINC 429 data buses. Different data buses may be used with the basic architecture. One aspect of the present invention is to utilize two dissimilar data buses utilized for redundancy management purposes.

Referring to FIGS. 3B and 3C, there are additional data buses used between the PFCCs 104, between the REUs 114, and between the REUs 114 and the MCEs 102 for exchange of various types of data. It should be noted that the AFCU 106 does not require any data busses when in operation and, in fact, the AFCU 106 operates independently of the PFCCs 104. One aspect of the invention provides for a separate control path from the pilot control sensors to each primary control surface and a spoiler pair. The separate control path only requires the primary system achieve a fail-safe state prior to activation.

The AFCU 106 is intended to provide pilot control of the airplane in case an unlikely event occurs that prevents all REUs 114 from functioning. This entails interfaces appropriate to perform servo loop control of the following primary flight control actuators: 2 Aileron actuators 16; 2 Elevator actuators 12 and 1 Rudder actuator 14, for example.

The AFCU 106 has the capability to engage each axis individually. In addition, when the pitch axis is engaged, it can enable trim switch inputs from the cockpit that can move the Horizontal Stabilizer Trim Actuator (HSTA) 120 through the MCE 102. In order to engage any axis, the AFCU 106 should be enabled and armed. The AFCU ENABLE signal is derived from a set of discrete inputs from the REUs 114 using a simple logic algorithm. The ARM signal is generated from an ARINC 429 discrete from the PFCCs 104. The ENABLE and ARM signals are generated from independent circuitry and are latched to the active state when the ARM signal is received from the PFCCs 104.

The AFCU 106 interfaces to the pilot and co-pilot sidestick controllers 118 and the rudder pedals 122 in order to determine pilot commands. When the AFCU 106 is engaged these commands are transformed to actuator position command signals using prescribed control laws when the AFCU 106 is engaged.

The control laws alter the cockpit commands in the following ways:

Add Pilot/CoPilot sidestick commands

Perform a non-linear translation of the cockpit commands

Augment the command with pitch, roll or yaw stabilization as required (note that some stabilization may occur after the multiplier step)

Multiply the command by one of two gain settings

Subtract the command from the RAM position

Convert the command to an EHSV current

In one embodiment, the air speed gain has two possible settings; low gain (flap 18/slats 20 retracted) for high speed and high gain (flap 18/slats 20 extended) for low speed. The data for gain setting is extracted from an Air Data (DMC) ARINC 429 receiver. The pitch and yaw stabilization data is extracted from an Inertial Reference Unit (IRU) ARINC 429 receiver. To increase availability of these functions there are two DMC receivers and two IRU receivers.

The AFCU 106 communicates with the PFCCs 104 via high speed ARINC 429. Each of three PFCCs 104 has one receiver and transmitter connected to the AFCU 106. In effect, the AFCU 106 has three PFCC receivers, but only requires one FCC transmitter with three buffers. The PFCCs 104 transmit commands (i.e. ARM) to the AFCU 106 on this bus 124 and the AFCU 106 transmits data and engage status to the PFCCs 104 for monitoring purposes. The AFCU 106 uses a single 28VDC input, capable of operating from 16VDC to 32.5VDC. It also has the capability for 10 msec of holdup power, which does not apply to the HI current SOV drivers.

As illustrated in FIGS. 3A-3C, there are four pair of REU Enable discretes for the elevator (e.g., REU1, REU2, REU3, REU4) and aileron (e.g., OB AIL REU, IB Ail REU, IB Ail REU, OB Ail REU) and there are three pair of REU Enable discretes (AFT REU, 1, AFT REU 2, AFT REU4) for the rudder. The discretes enable the AFCU 106 when open, and disable the AFCU 106 when shorted. The logic for enabling each axis is as follows:

Elevators and HSTA Enable when any three pair of Elevator REU Enable discretes are open Ailerons Enable when any three pair of Aileron REU Enable discretes are open Rudder Enables when any two pair of Rudder REU Enable discretes are open The Enable for each axis is not latched until ARM is set true. The Latched Enable signal for each axis turns on the HI side SOVs and the HI side EHSV current switches. Once latched, the Enable will only return to the off state with a power cycle or a reset command from the PFCCs.

ARM is commanded true from the PFCCs by axis and requires two FCC ARM commands in the same frame of ARINC data. The ARM can also be set to true if all three FCC ARINC signals are determined to be invalid. The ARM signal latches for each axis and turns on the LO side SOVs and the LO side EHSV current switches. Once set to on, the Latched ARM signal will only return to the off state with a power cycle or a reset command from the PFCCs.

On power up, the AFCU 106 resets all latches and ARINC monitors. The power up reset is stretched and transmitted to the PFCCs 106 via the ARINC 429 interface. This facilitates testing of the reset signal during power up testing (P-BIT). A continuous monitor is implemented to detect when FPGA power is not valid. When FPGA power is not valid, the LO side SOVs and EHSV current switches are disabled using circuitry that is not dependent on the state of the FPGA power supply and analysis must demonstrate that low power conditions default to the disabled state. This signal is stretched for at least 200 mS beyond the time it takes to reset the FPGA to ensure the FPGA signals are in a known state and this state can be detected via FCC ARINC communications.

Resets can also be generated from the PFCCs 104 via ARINC 429 commands. There are two reset commands that will test all aspects of AFCU 106 reset. One method utilizes the continuous monitor that will test its ability to reset the AFCU 160 for both over and under voltage conditions. The PFCC power monitor test also has the ability to block the reset signal to the latches (ARM and Enable) and the FPGA. In this way the disable state of the LO side drivers can be verified. The signal that blocks the reset clears only the Latched ARM signal when it is set HI without initiating the power monitor test.

The basic design philosophy that limits inadvertent engagement of the AFCU 160 is separation of the power monitor, Engage, and ARM functions. These three functions have independent circuitry powered by isolated supplies along with physical separation. Signals that cross functional lines are buffered such that single failures will not result in engaging the AFCU 106 and these failures are detectable.

A key power monitor function is to monitor the FPGA power and disable the drivers associated with the ARM signals when FPGA power is not within specified limits for normal operation (see Reset Conditions). The Enable functions have very simple logic algorithms that are easily analyzable and testable. The ARM function is generated by a more complex device that is performing all other AFCU functions and is protected by a Cyclic Redundancy Check (CRC) on the ARINC Bus from the PFCCs. Also, if arming occurs due to loss of all PFCCs, it must be coupled with REU enable discretes to completely engage. All three of these functions are tested at power up by the PFCCs indicating that the probability of inadvertent engagement is greater than 1E-09.

One aspect of the invention relates to verifying AFCU 106 functionality. For example, there are three methods of verifying AFCU functionality that will support availability and inadvertent engagement requirements. They are continuous monitors (C-BIT), Power up tests (P-BIT) and initiated tests (I-BIT), for example.

The AFCU 106 has two C-BIT monitors. The power supply for the FPGA is monitored continuously and is described in the Reset Conditions above. The ARINC data from the PFCCs 156, DMCs and IRUs are continuously monitored for parity, Sign Status Matrix (SSM) and health monitor validity. The PFCCs 156 are also monitored for a valid cyclic redundancy check (CRC).

The FCC also has C-BIT monitors associated with verifying AFCU 106 functionality. The ARINC bus from the AFCU is continuously monitored for parity, Sign Status Matrix (SSM) and health monitor validity. In addition, the following data groups are monitored for proper values:

a. Verify AFCU power supply signals are within operating tolerances b. Compare AFCU wrapped IRS Data against computed values c. Compare AFCU wrapped DMC Data against computed values d. Verify AFCU Position Commands are correct per control laws e. Compare AFCU REU Enable Discretes against computed values
f. Verify AFCU ARM and Enable Signals are in correct state
g. Verify EHSV currents are correct per control laws
h. Verify SOV currents are HI for engaged and off for all other conditions
i. Verify sums of all cockpit control position sensors are within acceptable limits
j. Compare AFCU cockpit control position sensor data against other sources of cockpit control position sensor data
k. Verify sums of all RAM LVDT position sensors are within acceptable limits
l. Compare AFCU RAM position sensor data against other sources of RAM position sensor data.
m. Verify sum of HSTA RVDT position sensor is within acceptable limits
n. Compare AFCU HSTA position sensor data against other sources of HSTA position sensor data.
o. Verify MCE ARM and ENABLE discretes from the AFCU are on when Elevators are engaged and off in all other conditions. Note that when no ARINC data is being transmitted from the AFCU, this information could be used to support the assumption that the AFCU is off or reset.

The PFCCs 104 perform the following P-BIT associated with verifying AFCU functionality:
a. AFCU ARINC bus monitors
b. AFCU power supply monitor
c. ENABLE Logic
d. ARM Logic
e. EHSV current is tested in three states ENABLED only, ARMED only, and ENGAGED
f. SOV current in three states ENABLED only, ARMED only, and ENGAGED Note that C-BIT is also running during the P-BIT tests and will flag failures if data returned from the AFCU is not as expected.

The FCC performs the following I-BIT associated with verifying AFCU functionality:
a. Pitch Control
b. Roll Control
c. The Rudder 14 moves as expected with rudder pedal 122 commands Note that C-BIT is also running during the I-BIT tests and will flag failures if data returned from the AFCU 106 is not as expected.

The AFCU 106 may be powered from a single 28VDC input source. The AFCU is configured to receive the following input data:
a. Two High Speed DMC ARINC 429 receivers for Control Law Gain calculation
b. Two High Speed IRU ARINC 429 receivers for stability control
c. Three High Speed FCC ARINC 429 receivers for command input
d. Five cockpit control RVDT inputs
e. Five RAM position LVDT inputs
f. One HSTA position RVDT input The AFCU 106 provides the following output data:
a. Three High Speed FCC ARINC 429 transmitters for AFCU status
b. Three cockpit control RVDT excitation signals
c. Five RAM LVDT excitation signals
d. One HSTA RVDT excitation signal
e. Five EHSV current drivers (HI and LO)
f. Five SOV drivers (HI and LO)
g. Four Damped SOV drivers (HI and LO)
h. Two discrete output pairs for HSTA trim control; short=enable/arm trim, open=disable trim The IRU ARINC 429 input data provides inertial reference information for all three axes. Stability control for pitch, roll and yaw is defined in the control. There are several key benefits of the proposed system over existing art. These benefits include the following:

Direct control from the flight deck to the control surfaces while not having complete dependence on the PFCCs 104. Control without the flight control computers is by way of IIMs to the REUs. This provides two distinct advantages: First, the availability requirement for the FCCs drops from as much as "Catastrophic" to "Major" (as defined in FAA certification guidelines), which can significantly reduce the cost of the FCCs and; Secondly, there is no physical switching of control signals (the primary signal and the secondary signals are continuously provided to the actuator controllers).

Use of data concentrators (IIMs) provides the following advantages:
a. Pilot control sensor excitation and demodulation
b. Dual dissimilar data bus control for communication with both the PFCCs and the REUs.

REUs 114 may contain two servo loop channels and two serial data bus channels for actuator control of different types. Each REU can provide the following capabilities:
a. Command response based on data from either one of two dissimilar data buses
b. Force fight mitigation
c. Rigging
d. Monitoring and self-testing Availability of a separate control path from the pilot control sensors to each primary control surface and a spoiler pair. The separate control path only requires the primary system achieve a fail-safe state.

In systems such as the Gulfstream G650, they have an alternate control path by way of a Backup Flight Control Unit (BFCU) however, it relies on the REUs to provide the servo loop closure (and Direct mode control laws housed in the REUs). In this incarnation, the AFCU contains the Direct mode control laws (provided by the customer) and the servo loops. Furthermore, the AFCU sends analog signals to the actuators and reads analog return signals from the actuators directly, not relying on any data buses.

In summary, the architecture described herein includes the following attributes: The system is designed to work without the PFCCs. The PFCCs can all fail and the system will operate acceptably without it being an emergency. The Inceptor Interface Modules (IIMs), which act as data concentrators, allow for data transfer to the PFCCs or to the REUs for use in the applicable control laws. The Remote Electronic Units (REUs) link to both the PFCCs and the IIMs to process signals with extra redundancy. The Alternate Flight Control Unit (AFCU) provides a wholly independent mechanism of maintaining continued safe flight and landing with the loss of part of all of the primary flight control system. The AFCUs utilize dedicated and separate flight deck sensors and provide separate control signals directly to the actuators.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A flight control system comprising: a primary flight control path from one or more pilot controls to control surface actuators on an associated aircraft, wherein the primary control path includes one or more flight control computers and one or more first data concentrators; and a secondary flight control path from the one or more pilot controls to the control surface actuators, wherein the secondary flight control path utilizes direct mode control laws to control the control surface actuators; wherein the primary control path includes remote electronic units operatively coupled to the one or more data concentrators, and wherein the secondary control path bypasses all remote electronic units, and wherein the primary flight control path and the secondary flight control path are independent from each other over the control paths from the one or more pilot controls to the control surface actuators, and the secondary flight control path is operative upon detection of a fault in the primary flight control path.

2. The system of claim 1, wherein the one or more first data concentrators are coupled between the one or more pilot controls and the one or more flight control computers, wherein the data concentrators monitor the one or more pilot controls and transmit control information to the one or more flight control computers.

3. The system of claim 2, wherein at least one of the one or more first data concentrators is an inceptor interface module.

4. The system of claim 2, further including one or more remote electronic units coupled to the one or more flight control computers and the one or more data concentrators.

5. The system of claim 1, wherein the one or more flight control computers is configured to receive pilot commands from at least one of the first data concentrators, and further including an alternate flight control unit, wherein the alternate flight control unit is operable once the alternate flight control unit is enabled and armed.

6. The system of claim 5, wherein the alternate flight control unit is configured to receive discrete inputs from one or more remote electronic units to facilitate enabling the alternate flight control unit.

7. The system of claim 6, wherein the alternate flight control unit is configured to receive discrete inputs from the one or more flight control computers to facilitate arming the alternate flight control unit.

8. The system of claim 6, wherein the alternate flight control unit is configured to receive additional discrete inputs from the one or more flight control computers to facilitate arming the alternate flight control unit.

9. The system of claim 1, further including one or more time triggered protocol busses coupled between the one or more flight control computers and one or more remote electronic units to facilitate movement of one or more control surfaces via an analog signal path.

10. The system of claim 1, further including one or more remote electronic units operatively coupled to the one or more data concentrators, wherein the one or more data concentrators are operatively coupled between the one or more flight control computers and the one or more remote electronic units.

11. The system of claim 1, further including a tertiary flight control path from one or more pilot controls to control surface actuators, wherein the tertiary control path includes the one or more first data concentrators and bypasses all flight control computers.

12. The system of claim 11, wherein the primary flight control path includes one or more remote electronic units operatively coupled between the one or more flight control computers and the control surface actuators, and wherein the tertiary flight control path includes the one or more remote electronic units operatively coupled between the one or more first data concentrators and the control surface actuators.

13. The system of claim 12, wherein a first data bus operatively couples the one or more remote electronic units to the one or more flight control computers and a second data bus operatively couples the one or more remote electronic units to the one or more first data concentrators, and wherein the first and second data busses have dissimilar hardware and/or firmware.

* * * * *